July 2, 1940.　　M. PIER ET AL　　2,206,729
LOW TEMPERATURE HYDROGENATION PROCESS
Filed Aug. 14, 1937
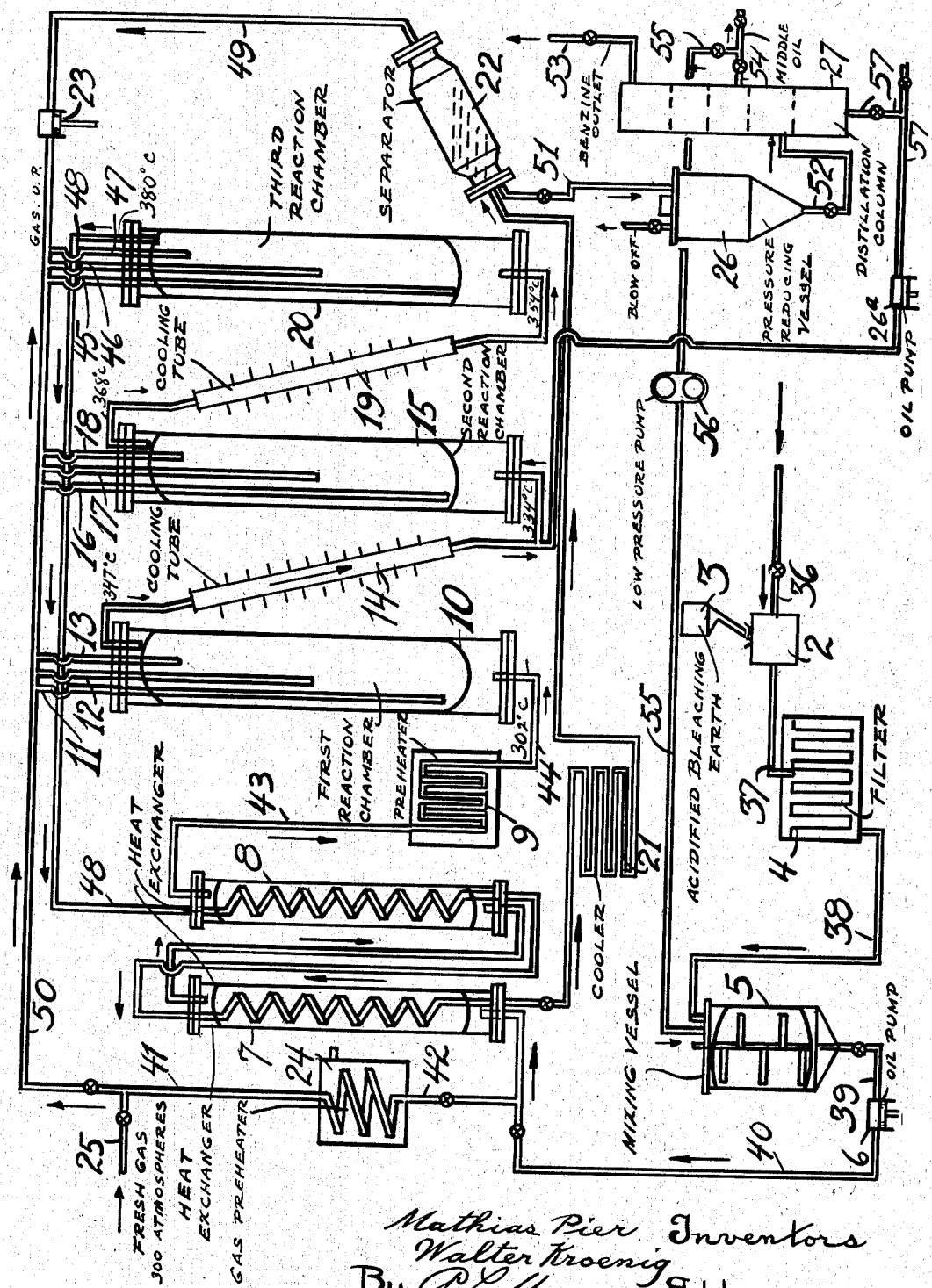
Mathias Pier, Walter Kroenig, Inventors
By P. L. Young, Attorney Patented July 2, 1940

2,206,729

UNITED STATES PATENT OFFICE 2,206,729

LOW TEMPERATURE HYDROGENATION PROCESS

Mathias Pier, Heidelberg, and Walter Kroenig, Ludwigshafen-on-the-Rhine, Germany, assignors to Standard-I. G. Company, Linden, N. J., a corporation of Delaware Application August 14, 1937, Serial No. 159,092
In Germany August 15, 1936

12 Claims. (Cl. 196—53)

The present invention relates to the catalytic treatment with hydrogenating gases of liquid, semi-solid or fusible distillable carbonaceous materials containing asphaltic substances, at elevated temperatures and under increased pressures for the production of hydrocarbon products of the type of petroleum products.

The expression asphaltic substances when used herein is intended to comprise besides true asphalts also resinous substances and compounds or mixtures forming asphalts or resins when heated, for example, compounds containing oxygen or sulphur or both, which are polymerisable or condensible to asphalts or resins.

In the early experimental and semi-technical development of the hydrogenation process the operation was carried out in one stage, that is to say the initial materials and hydrogen were brought to reaction under one set of reaction conditions. The main aim of the hydrogenation process in the early days was the production of benzine. Consequently with initial materials such as tars, the early endeavours were directed to obtaining in one operation said desired end-product with the highest possible yield. Catalysts have been applied in this development work, both finely dispersed in the material or stationarily contained in the reaction space. With carbonaceous materials containing asphaltic substances deposits were readily formed as the case might be on the solid catalysts stationarily contained in the reaction space or on the finely divided catalysts dispersed in the reagents, which deposits strongly reduce the activity of the catalyst, so that it became necessary to replace the dispersed catalyst either continuously or intermittently within short intervals. When operating on an industrial scale solid catalysts stationarily contained in the reaction space were therefore not hitherto employed with such materials because they could only have been replaced by fresh catalysts after interruption of the reaction, which would have made the process very expensive.

It was then found that the hydrogenation process could be greatly improved by working in stages, under different conditions and first producing from heavy initial materials boiling above about 325° centigrade in the liquid phase with finely dispersed catalysts products of the boiling point range of middle oil and treating these products in the gas phase in the presence of stationary catalysts for the production of benzine. It was then further found that also initial materials containing besides middle oil a substantial amount of higher boiling products could be treated in the gas phase, if they were free from or freed from asphaltic substances.

We have now found that valuable hydrocarbon products can be produced from liquid, semi-solid or fusible distillable carbonaceous materials which contain asphaltic substances if said initial materials, preferably those which have not undergone a heat treatment above 800° centigrade, in particular, products of a destructive distillation of solid carbonaceous materials, are treated in the liquid phase with hydrogenating gases, namely hydrogen or gases containing sufficient free hydrogen in contact with catalysts immune from poisoning by sulphur, or good hydrogenating activity in a high concentration with a throughput between 0.2 and 1.5 kilograms, preferably 0.3 to 0.8 kilogram, per hour per litre of reaction space under a pressure of at least 50 atmospheres and a temperature between 270° and 420° centigrade, preferably below 400° centigrade, and especially when working with strongly or fairly strongly hydrogenating catalysts during a substantial part of the treatment not above 380° centigrade, preferably between 300° and 380° centigrade and co-ordinating the said conditions so that the content of asphaltic substances, in particular asphalts, is reduced in continuous operation by at least 90 per cent and less than 5 per cent, preferably less than 2.5 per cent of gaseous hydrocarbons calculated as carbon on carbon of the initial material and less than 20 per cent of products boiling below 350° centigrade are newly formed.

The process in accordance with the present invention is hereinafter referred to for the sake of brevity as "low temperature hydrogenation" and may be fully understood when read in conjunction with the accompanying drawing which represents in partial sectional elevation a suitable apparatus for carrying out one modification of applicants' invention, it being understood, of course, that the invention is not limited thereto.

In the drawing a starting material containing asphaltic substances, for example, asphalt containing crude oil, is led through line 36 to vessel 2 wherein the initial materials are treated with bleaching earth that has been pretreated with acid led to vessel 2 from vessel 3. The crude oil then passes through line 37 to filtering vessel 4 wherein the solid constituents such as ash and bleaching earth are separated. The crude oil then passes through line 38 to mixing vessel 5 in which it is mixed with a middle oil at a temperature of about 80°. The mixture is then led through line 39 to pump 6 which forces it through line 40 at a pressure of 300 atmospheres to heat exchanger 7. Hydrogen at a pressure of 300 atmospheres enters the system by way of line 25, part of it passing through line 41, through gas preheater 24, and then into line 40 by way of line 42. The mixture of crude oil and middle oil passes through gas preheater 24. The mixture leaves heat exchanger 8 by way of line 43 and passes through preheater 9 which it leaves at a temperature of 302° C. by way of line 44 to pass into the first reaction chamber 10.

The temperature within reaction chamber 10 rises from 302° at the entrance to 347° at the exit, the temperature being controlled by the introduction of cold hydrogen through lines 11, 12 and 13. The products leave reaction chamber 10 to pass through cooling tube 14 and are introduced into the second reaction chamber 15 at a temperature of 334°. The temperature in this reaction chamber rises from 334° at the entrance to 368° at the exit and is controlled by the introduction of cold hydrogen by way of lines 16, 17 and 18. The products leave reaction chamber 15 to pass through cooling tube 19, which is similar to cooling tube 14, and enter the third reaction chamber 20 at a temperature of 354°. The temperature in this reaction chamber rises from 354° at the entrance to 380° at the exit and is again controlled by the introduction of cold hydrogen by way of lines 45, 46 and 47.

The reaction products leave reaction chamber 20 by way of line 48 and pass through heat exchangers 8 and 7 into and through cooler 21 to separating vessel 22. Here the gaseous constituents, especially the unused hydrogen, separate from the liquid constituents and pass through line 49 to pump 23 so that they may again be introduced into the three reaction chambers by way of lines 11 to 13, elements 14 and 19 and lines 16 to 18 or 45 to 47. The portion of initial hydrogen entering through line 25 but not passing through line 41 passes through line 50 to also feed the reaction chambers.

The liquid constituents leave separator 22 by way of line 51, pass through pressure reducing vessel 26 and into distillation column 27 by way of line 52. The benzine produced leaves distillation column 27 by way of line 53, and the middle oil leaves by way of line 54. A portion of said middle oil is diverted from line 54 into line 55 through low pressure pump 56 and passes to mixing vessel 5 so as to be mixed with the initial crude oil. The non-distilled portion remaining in distillation column 27 may be passed through line 57 to pump 26a and introduced into the second reaction chamber 15.

Said low temperature hydrogenation may be followed by a treatment under more rigorous conditions, for example, by further elevating the temperature in the latter part of the same or a further reaction vessel. For example, temperatures of 430, 450, 480° centigrade and more may be employed and under these more rigorous conditions a higher gasification may occur.

It is usually very important in the low temperature hydrogenation especially when working with strongly or fairly strongly hydrogenating catalysts that a substantial part of the reaction space be maintained at a temperature below 380° centigrade, so that the asphaltic substances, in particular asphalts, are sufficiently reduced and are not subjected to higher temperatures where these are subsequently employed. The reaction temperature is preferably maintained below 380° centigrade as long as the content of asphaltic substances, more particularly asphalts in the reagent mixture exceeds 2 per cent.

It is necessary to determine by preliminary tests the most suitable temperatures within the given limits for each single initial material and catalyst. Increase in temperature will under otherwise like conditions tend towards increase in gasification and vice versa. For reduction of asphaltic substances an approximately optimum range of temperature conditions exists for a given set of conditions which should be predetermined in each case in order to obtain the best result.

It is of particular advantage in low temperature hydrogenation to allow the temperature of the material passing through the reaction zone to increase gradually or stepwise. If desired several reaction vessels in series may be employed at successively higher temperatures. Reaction products may be removed between any of the reaction vessels, if desired.

The temperature is usually maintained between 10° and 100° centigrade higher, preferably between 20° and 80° centigrade higher at the end of the low temperature hydrogenation than at the commencement, in particular with low temperature tars from brown coal or bituminous coal. For example, at the point of introduction of the initial materials into the low temperature hydrogenation zone a temperature of about 300° to 360° centigrade may be maintained and at the point of withdrawal a temperature of about 360° to 400° centigrade. In some cases, for example, in some cases with initial materials other than the aforesaid low temperature tars, the temperature differences between the beginning and the end of the reaction may be greater, for example, up to 200° centigrade, whereby the end temperatures may run up outside the maximum for low temperature hydrogenation.

Usually within the low temperature hydrogenation temperature range, if temperatures above 380° centigrade are employed in the low temperature hydrogenation, the materials have a temperature above 380° centigrade for less than one fifth of their total sojourn in the reaction space, when employing strong or fairly strong hydrogenating catalysts. During the increase in temperature an intermediate lowering of the temperature may occur, for example, at the point of introduction of cooling agents, so that if the temperatures are plotted on a graph, they increase not in a straight line, but in a zig-zag line, resembling the teeth of a saw. The temperature at the commencement of the reaction and also the further temperatures must be maintained so low that a fouling of the catalyst by deposition of the asphaltic substances is avoided. It must be so selected and adjusted that not too much hydrogen is taken up by the hydrocarbon materials, which would lead to flocculation of asphalt, and that the splitting action does not exceed the limits indicated above. The increase in temperature must be so selected that on attaining higher temperatures, where these are employed, that is to say, of about 400°, those asphaltic substances which can be precipitated by hydrocarbons rich in hydrogen have been practically completely reduced.

The temperature in the reaction zone can be regulated by the introduction of cooler gas or oil in any desired manner, or by devices through which cooling fluids flow.

The cooling gases employed are usually the hydrogenating gases themselves and, for example, about half of the hydrogenating gases may be introduced through the preheater and the other half through the nozzles for the introduction of cooling medium.

The points of the introduction for temperature regulation of cooling media into the reaction space may be distributed as required. It has been found that usually the formation of gaseous hydrocarbons is reduced to a minimum in low temperature hydrogenation by introducing more cooling agent in the first part of the apparatus than later. For example, 50 to 85 per cent of the total cooling gas may be introduced in the first third of the reaction space. This may be done in various ways, for example, by arranging for a greater number of points of introduction of cooling media in the first part, for example, the first third of the reaction space than in the rest of the reaction space.

In low temperature hydrogenation it has proved to be very advantageous when working with several reaction vessels in series to regulate the temperature by a suitable cooling of the conduits connecting said reaction vessels. For this purpose the exterior surfaces of the connecting tubes may be provided with radiating surfaces, such as discs or ribs or with thorns. In order to attain a stronger cooling said conduits may in addition be surrounded by a jacket through which cooling water, steam or a rapid current of air is passed. By regulation of the rate of flow of the cooling medium in the jacket the temperature of the reagents passing through the conduits can be easily regulated. The conduit may also take the form of a heat exchanger in which one or more of the reagents, for example hydrogen, are passed in heat exchange relation with the materials passing through the conduit, preferably in counter-current. It is frequently desirable to avoid in the conduit a reduction in temperature of more than about 20° centigrade. Also different methods of temperature regulation may be employed simultaneously.

The other reaction conditions, such as throughput and pressure are also preferably determined by preliminary tests. The pressures employed are usually above 150 atmospheres, preferably between 200 and 400 atmospheres. Where improved results are obtained higher pressures of 500, 600, 700, 1000 atmospheres or more may be employed. Increase in throughputs tends towards a decrease in gasification but also a decrease in the reduction of asphaltic substances. Different pressures may be employed in different stages of low temperature hydrogenation, for example, stages of increasing or decreasing pressure as required.

The gases for use in the low temperature hydrogenation may consist of hydrogen alone or of mixtures containing hydrogen, for example, a mixture of hydrogen with nitrogen or ammonia or water gas or of hydrogen mixed with carbon dioxide, hydrogen sulphide, water vapour or methane, or other hydrocarbons, the amounts of the admixtures being preferably adjusted in accordance with the results in view.

The amounts of hydrogen or gases containing hydrogen employed should be selected according to the circumstances. Usually 1000 to 5000 cubic metres of hydrogen per ton of material treated are employed and in most cases 1500 to 3000 cubic metres, say 2000 cubic metres, are used with success. Different proportions of hydrogen may be maintained in different parts of the reaction space. The gases may be used in a state of flow and, if desired, recycled, preferably while maintaining the pressure thereon and usually with adjustment of their composition.

In the low temperature hydrogenation in accordance with the present invention a mild conversion takes place, whereby the asphaltic substances are reduced without deposits in the reaction space and fouling of the catalysts occurring.

As a consequence thereof, solid catalysts stationarily contained in the reaction space may be employed, and one of the chief advantages thereof is that the catalyst may be used in a considerably greater concentration with respect to the materials which are to be treated with hydrogenating gases than when employing dispersed catalyst. The stationary catalyst may substantially fill the reaction space or a great part thereof and may, for example, be present in a proportion of 100 per cent by volume or more in relation to the carbonaceous material present at any time in the reaction space, or also in smaller concentrations. The low temperature hydrogenation in accordance with the present invention may also be carried out with high concentrations of catalyst dispersed in the reaction material, for example, at least 10 per cent of active catalyst substance and advantageously more than 20 per cent, calculated on the amount of carbonaceous material present in the reaction space, say 25 to 30 per cent or so. Both stationary and dispersed catalysts may be employed simultaneously, if desired.

The initial materials suitable for treatment chiefly comprise distillation products of solid carbonaceous materials such as tars obtained at temperatures below 300° centigrade, in particular low temperature carbonisation tars. Also mixed base and asphalt base mineral oils or fractions thereof having high boiling points may be treated. Products obtained by distillation, cracking, extraction or hydrogenation of mineral oils, for example, residues obtained in the cracking of gas oils, or high boiling products obtained by polymerising or condensing carbonaceous materials of low molecular weight and which contain asphaltic substances may also be treated. It may be of advantage to remove a part of the asphalts from the initial materials by a preliminary treatment prior to the low temperature hydrogenation.

The asphalt content of the initial materials should preferably not surpass a certain limit, in order to guarantee an uninterrupted operation. For cracking distillation residues from the gas oil production the asphalt content should preferably be below 12 per cent and for cracked oils below 7 per cent. The above are rough indications by which it is not intended to limit the invention.

The asphalt content of the initial materials for low temperature hydrogenation or of the reaction products etc. referred to herein is determined as follows when another method, such as Holde's method is not expressly specified:

2 grams of the oil the asphalt content of which is to be determined are dissolved in 5 cubic centimetres of benzene. 100 cubic centimetres of Kahlbaum-benzine (that is a benzine for analysis produced by the German firm of Kahlbaum) are added to this solution. This is then left standing in the dark at ordinary temperature for 8 hours. The precipitated asphalt is filtered off and washed with Kahlbaum-benzine. The washed asphalt is thereupon dissolved in benzene, the solution obtained filtered, the benzene evaporated therefrom and the residual asphalt weighed.

Materials which are unsuitable for treatment by low temperature hydrogenation may be rendered amenable to low temperature hydrogenation by a suitable preliminary refining. In particular it is advantageous to subject such initial materials or fractions thereof to a mild treatment with hydrogen at a temperature below that at which foaming commences with materials liable to foam, as a rule below 300° C., preferably at a temperature between 100° and 275° C. so that the injurious constituents are rendered innocuous. This mild pretreatment is usually carried out under pressures of between 20 and 500 atmospheres, say 150 and 400 atmospheres in contact with hydrogenating catalysts, which may, if desired, be stationary in the reaction space. Also dispersed catalysts may be employed, if desired. The materials thus treated may pass direct into the low temperature hydrogenation zone, but they are preferably preheated, for example, in an interposed preheater or heat exchanger.

In some cases also other preliminary treatments, such as treatment with hydrogen for reducing the contents of asphalts, for example at a temperature between 300 and 475° C. and under pressures of between 100 and 600 atmospheres or treatment with selective solvents or precipitants for asphalts or with adsorption agents or chemical refining means, lead to the desired results.

In order to obtain good results in low temperature hydrogenation in accordance with the present invention the materials treated should be free from or substantially free from ash and like solid matter. They should preferably contain less than 0.1 per cent of ash, advantageously less than 0.05 per cent and if they contain larger amounts they should be deashed to below this limit.

To obtain good results it is desirable that the mixture subjected to low temperature hydrogenation contains at least 25 to 75 per cent of middle oils (200° to 350° centigrade) as otherwise flocculation as asphaltic substances is liable to occur. It may also be advantageous to add diluents which may have the function of solvents for asphaltic substances or of promoting the solubility of asphaltic substances or of diluents to reduce the concentration of asphalt.

Suitable diluents are naphthalene, anthracene, pyrene and similar polynuclear aromatic hydrocarbons and mixtures thereof, and also partly hydrogenated polynuclear aromatic hydrocarbons such as tetrahydronaphthalene, or fractions, containing aromatic polynuclear hydrocarbons, of tars, asphalt-base and mixed base mineral oils or of products of destructive hydrogenation and the like.

The catalysts chiefly employed for low temperature hydrogenation in accordance with the present invention are sulphides of heavy metals, more particularly of those of groups 5, 6, and 7 of the periodic table of the elements or of the iron group or catalysts containing these. In particular, highly active sulphides, such as are obtained by decomposition of thiosalts, or by sulphidising at high temperature and pressure or by a process involving precipitation of polysulphides from aqueous solutions may be employed. Other compounds of said metals, such as the oxides, hydroxides, phosphates, halides, thiosalts, carbonates, salts of organic acids and the like, which have hydrogenating activity may also be employed, and many of these compounds are converted into sulphides under the reaction conditions. Several of these substances may be employed together or in admixture with one another, if desired.

Sulphides and/or oxides of other metals may, if desired, be added to such heavy metal compounds and also, if desired, metalloids, for example, halogen in the form of free halogen, hydrogen halides or substances supplying free halogen or hydrogen halides under the reaction conditions, for instance, organic halogen compounds, or sulphur, selenium or tellurium, or compounds of these metalloids.

When desired the catalysts may be supported on carriers.

Apart from what has already been stated in connection with operation with diluents it is very advantageous to arrange several different catalysts one after the other in one reaction vessel or in several reaction vessels. Particularly good results are obtained by first passing the initial material over a catalyst of weaker hydrogenating activity (for example mixtures of molybdic acid and magnesia or sulphides or oxides of iron, manganese, cobalt, zinc or silver or also catalysts which per se have a strong hydrogenating activity but which have been subjected to prolonged use and have thereby been reduced in their activity) and subsequently over a catalyst of stronger hydrogenating activity (for example, tungsten or molybdenum sulphide). Usually a smaller part, say up to the first third of the low temperature hydrogenation space, contains catalysts of weaker hydrogenating action.

The working temperature is adapted among other things to the specific hydrogenating and splitting properties of the particular catalyst involved and therefore different temperatures may be employed in each of the zones or stages in which different catalysts are employed.

The greater the activity of the catalyst the lower is the temperature employed. For example in the low temperature hydrogenation of brown coal tars with catalysts of strong hydrogenating activity, for example, sulphides of metals of the 5th or 6th group of the periodic system, in particular the sulphides of molybdenum and tungsten, and especially those obtained by sulphidizing under rigorous conditions or by decomposition of thiosalts, temperatures of at least 270° C., preferably of at least 290° C. are taken. When catalysts having a fairly strong hydrogenating action are employed, temperatures of 340° centigrade and more come into question. As examples of catalysts having a fairly strong hydrogenating action may be mentioned: (a) the sulphides of the metals of the 5th or 6th group of the periodic system, the hydrogenating action of which has been reduced by the addition of other sulphides or other compounds, for example, metal oxides, phosphates, halides and the like, or by the employment of oxides of metals of the 5th or 6th group; (b) oxides of the metals of the 5th or 6th group of the periodic system and (c) sulphides of cobalt and nickel. The highest initial temperature permissible depends on the nature of the initial material subjected to low temperature hydrogenation, for example, with some normal brown coal low temperature tars the highest permissible initial temperature when employing strong hydrogenating catalysts is about 350° to 360°, centigrade, whereas when employing catalysts of fairly strong hydrogenating activity the said maximum initial temperature with this initial materials may be about 370° to 380° centigrade. At least 10 per cent of the reaction space containing catalyst is preferably maintained at or below these maximum initial temperatures. With catalysts of weak hydrogenating activity, for example, other oxidic catalysts or sulphides of weakly hydrogenating activity, for example, of iron, manganese, zinc and the like or other metal compounds, initial temperatures of between 350° and 400° centigrade may be employed. The above mentioned data are however only given as rough indications and not as a strict guiding rule and preliminary experiments are desirable to determine the most suitable temperature in each case.

A catalyst usually has strong or fairly strong hydrogenating activity if it answers to the following specification, namely if it is capable of bringing per litre of reaction space and per hour at least 150 litres and preferably at least 250 litres or more of hydrogen into reaction under the following conditions:

A middle oil boiling between 200° and 325° centigrade and having a specific gravity of 0.840, which is obtained from mineral oil by distillation, if necessary followed by an extraction treatment, is passed together with hydrogen under a pressure of 200 atmospheres at a temperature of 405° centigrade over the catalyst to be tested which is stationarily contained in the reaction space, the throughput being adjusted at 1.5 kilograms of oil per litre of catalyst and per hour and 3 cubic metres of hydrogen measured under normal conditions of temperature and pressure being introduced per kilogram of oil. Under these conditions as a rule 0.5 to 1 kilogram or more of benzine are formed per hour and per litre of catalyst.

The amount of hydrogen entering into reaction may be determined by a comparison of the analyses of the initial middle oil and of the total reaction products.

The low temperature hydrogenation process in accordance with the present invention is very remarkable, because it allows of the direct production from very impure asphaltic substances of wide boiling point range of products of the nature of pure mineral oils without appreciable losses due to gasification. For example, from initially semi-solid black materials, such as brown coal tars, pale yellow or even colourless products are obtained in a continuous manner and practically without gas formation. Moreover the consumption of catalyst is particularly low owing to the avoidance of fouling of the catalyst.

The pale yellow or colourless product obtained by low temperature hydrogenation is of such purity that the product or the middle oil fraction thereof can be directly destructively hydrogenated in the vapour phase in contact with catalysts.

The products obtained in the low temperature hydrogenation in accordance with the present invention may also be subjected to cracking with particularly good yields or to splitting or aromatising hydrogenations, in so far as these have not already been referred to, more particularly in the presence of stationarily arranged solid catalysts or other treatments, if desired, after an interposed extraction with selective solvents. Solvent extractions may also be employed to produce refined finished products.

The following examples will further illustrate how the present invention may be carried out in practice, but it should be understood that the invention is not limited to the examples. Percentages of gaseous hydrocarbons formed are always calculated as carbon to carbon.

Example 1

Tar from the low temperature carbonisation of brown coal, which contains 52 per cent of constituents boiling above 350° centigrade and 2.5 per cent of asphalt is passed together with hydrogen over a catalyst consisting of tungsten sulphide at a temperature gradually increasing from 345° to 370° centigrade and a pressure of 250 atmospheres, in an amount of 0.6 kilogram per litre reaction space per hour. The formation of gaseous hydrocarbons amounts to 0.7 per cent. The product obtained does not contain any asphalt. The increase of the constituents boiling below 350° centigrade amounts to 11 per cent. Calculated on the initial material, 15.5 per cent of a benzine boiling up to 200° centigrade (with 18 per cent of constituents boiling up to 100° centigrade and an octane number of 55), 37.5 per cent of middle oil, which boils from 200° to 325° centigrade, and 42 per cent of residue, from which a fraction boiling between 325° and 365° centigrade is separated. This fraction is dewaxed and the paraffin wax is converted, jointly with the part of the residue boiling above 365° centigrade, into benzine and a middle oil boiling up to 300° centigrade, at a reaction temperature of 385° centigrade and under a pressure of 200 atmospheres in the presence of tungsten sulphide as catalyst, whereby the constituents boiling above 300° centigrade are reintroduced into the destructive hydrogenation vessel. The benzines obtained in the first and second stage are mixed with each other. After mixing, the middle oils of both stages and the dewaxed fraction boiling between 325° to 365° centigrade give a very good Diesel oil with a cetene number 68.

Example 2

Low temperature carbonisation tar obtained from brown coal and containing 53 per cent of constituents boiling up to 350° centigrade and 2.7 per cent of hard asphalt determined according to Holde (see Holde, Kohlenwasserstofföle und Fette, 6th edition, pages 106–107) is heated up together with hydrogen under a pressure of 250 atmospheres in a heat exchanger in countercurrent flow with the effluent reaction products up to 320° centigrade and passed into a reaction unit consisting of 2 high pressure vessels of tower-like form. The reaction space is filled with a catalyst in the form of cubes prepared from molybdic acid, zinc oxide and magnesia. The throughput amounts to 0.5 kilogram of tar per litre reaction space per hour. The amount of the hydrogen applied amounts to 2500 cubic metres per ton of tar. In the first quarter of the reaction space the reaction temperature is allowed to rise up to 352° centigrade. By the introduction of cold hydrogen the temperature is lowered after the first quarter down to 347° centigrade. In the second quarter of the reaction space the temperature amounts to 365° centigrade. In the tube connecting the two reaction vessels a cooling occurs down to 359° centigrade. In the third quarter of the reaction space the temperature is allowed to rise up to 373° centigrade and is lowered at the beginning of the last quarter by the introduction of cold hydrogen down to 368° centigrade. In the last quarter the temperature rises again up to 373° centigrade. The product leaving the reaction space is cooled and collected. It contains 58 per cent of constituents boiling up to 350° centigrade, it is bright yellow in colour and does not contain any hard asphalt. It is a very suitable initial material for the production of lubricating oil by hydrogenation. The formation of gas in the low temperature hydrogenation treatment amounts to 0.3 per cent calculated as carbon with reference to the carbon of the initial material.

*Example 3*

Brown coal low temperature carbonisation tar containing 53 per cent of constituents boiling up to 350° centigrade and 2.7 per cent of asphalt determined according to Holde, is passed together with hydrogen under a pressure of 250 atmospheres through a reaction unit consisting of three high pressure vessels of tower-like form. The throughput amounts to 0.45 kilogram of tar per litre of reaction space per hour and the amount of hydrogenating gas applied amounts to 2000 cubic metres per ton of tar. The three reaction vessels are filled with a catalyst consisting of pelleted tungsten sulphide. The mixture of tar and hydrogen is heated in a gas heated preheater up to 302° centigrade and is introduced at this temperature into the first reaction vessel. In this vessel the temperature is allowed to rise up to 347° centigrade. The temperature of the mixture is lowered down to 334° centigrade in the tube connecting the first vessel with the second one which tube is provided with cooling surfaces in the form of thorns and cooled by means of water and/or a current of air.

In the second reaction vessel the temperature is allowed to rise up to 368° centigrade and is again lowered in the tube connecting the second vessel with the next one by cooling from the outside down to 354° centigrade. In the last reaction vessel the temperature rises up to 380° centigrade. Each reaction vessel is provided with 3 to 5 inlets for cold hydrogen. The addition of cold gas in each vessel is carried out in such a manner that the above indicated increases in temperature occur as gradually as possible. Of the 2000 cubic metres of hydrogenating gas about the half is added from the beginning to the tar, whereas the other half is introduced during the reaction as cooling gas. For this purpose there are required in the first third about 77 per cent, in the second third about 20 precent and in the last third about 3 per cent of the cooling gas. The reaction product leaving the last vessel is cooled and collected in a suitable vessel, it is colourless, free from hard asphalt and contains 68 per cent of constituents boiling up to 350° centigrade. It may be divided into the following products: 15 per cent of paraffin wax of which 80 per cent are hard and 20 per cent of which are soft paraffin wax;

11 per cent of lubricating oil having a viscosity index of 50 and a viscosity of 5° Engler/50° centigrade;

5 per cent of spindle oil with a viscosity of 5° Engler/20° centigrade;

50 per cent of gas oil with a cetene number of 57 and a viscosity of 1.22° Engler/20° centigrade;

20 per cent of benzine with 15 per cent of constituents boiling up to 100° centigrade.

What we claim is:

1. A process for the production of valuable hydrocarbon products from distillable carbonaceous materials which contain asphaltic substances, in which said initial material is treated in a continuous operation in the liquid phase with a hydrogenating gas in contact with a catalyst immune from poisoning by sulphur, of good hydrogenating activity in a high concentration, with a throughput between 0.2 and 1.5 kilograms per hour per liter of reaction space under a pressure of at least 50 atmospheres and at a temperature between 270° and 420° C., which increases while the material passes through the reaction zone, and at least during a substantial part of the treatment not above between 300° and 380° C., the said conditions being coordinated so that the content of asphaltic substances is reduced by at least 90 per cent, and less than 5 per cent of gaseous hydrocarbons calculated as carbon on carbon of the initial material and less than 20 per cent of products boiling below 350° C. are newly formed.

2. The process as claimed in claim 1, in which the temperature of the material passing through the reaction zone is gradually increased.

3. The process as claimed in claim 1, in which the temperature of the material passing through the reaction zone is stepwise increased.

4. In the process claimed in claim 1, maintaining a temperature of about 300° to 360° C. at the point of introduction of the initial materials into the hydrogenation zone and a temperature of about 360° to 400° C. at the point of withdrawal.

5. In the process claimed in claim 1, treating an initial material containing from 25 to 75 per cent of constituents boiling above 350° C.

6. In the process claimed in claim 1, treating an initial material containing less than 0.1 per cent of ash constituents.

7. In the process claimed in claim 1, adding a diluent to the initial material, which is liquid under the working conditions.

8. A process for the production of valuable hydrocarbon products from distillable carbonaceous materials which contain asphaltic substances, in which said initial material is treated in the liquid phase with a hydrogenating gas in contact with a catalyst immune from poisoning by sulphur under a pressure of between 150 and 400 atmospheres and at a temperature between 270° and 420° C. which is initially between 270° and 380° C. and which increases while the material passes through the reaction zone by from 20° to 100° C. and which temperature is regulated by introducing a cooling medium, the said conditions being coordinated so that less than 20 per cent of products boiling below 350° C. are newly formed.

9. In the production of valuable hydrocarbon products from distillable carbonaceous materials which contain asphaltic substances, in which said material is treated in the liquid phase with a hydrogenating gas in contact with a catalyst immune from poisoning by sulphur under a pressure of between 150 and 400 atmospheres and at a temperature between 270° and 420° C. which increases while the material passes through the reaction space, maintaining said material at a reaction temperature below 380° C. for at least four-fifths of its total sojourn in the reaction space and at a temperature above 380° C. for less than one fifth of its total sojourn in the reaction space, the said conditions being coordinated so that less than 20 per cent of products boiling below 350° C. are newly formed.

10. In the production of valuable hydrocarbon products from distillable carbonaceous materials which contain asphaltic substances, in which said initial material is treated in the liquid phase with a hydrogenating gas in contact with a catalyst immune from poisoning by sulphur under a pressure of between 150 and 400 atmospheres and at a temperature between 270° and 420° C. which is initially between 270 and 380° C. and which increases while the material passes through the reaction space, so selecting the temperatures that those asphaltic substances which can be precipitated by hydrocarbons rich in hydrogen are practically completely reduced before the material attains higher temperatures where these are produced, the said conditions being coordinated so that less than 20 per cent of products boiling below 350° C. are newly formed.

11. In the production of valuable hydrocarbon products from distillable carbonaceous materials which contain asphaltic substances, in which said initial material is treated in the liquid phase with a hydrogenating gas in contact with a catalyst immune from poisoning by sulphur under a pressure of between 150 and 400 atmospheres and at a temperature between 270° and 420° C. which increases while the material passes through the reaction space, maintaining the reaction temperature below 380° C. as long as the content of asphaltic substances in the reaction mixture exceeds 2 per cent, the said conditions being coordinated so that less than 20 per cent of products boiling below 350° C. are newly formed.

12. In the process claimed in claim 1, working with a stationary catalyst consisting of a compound of a heavy metal selected from groups 5, 6, 7 and 8 of the periodic system.

MATHIAS PIER.
WALTER KROENIG.